US010090581B2

(12) United States Patent
Wu et al.

(10) Patent No.: US 10,090,581 B2
(45) Date of Patent: Oct. 2, 2018

(54) MULTIPLE ANTENNA APPARATUS

(71) Applicant: PEGATRON CORPORATION, Taipei (TW)

(72) Inventors: Chien-Yi Wu, Taipei (TW); Chao-Hsu Wu, Taipei (TW); Yu-Yi Chu, Taipei (TW); Tse-Hsuan Wang, Taipei (TW); Shih-Keng Huang, Taipei (TW); Chia-Chi Chang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 15/847,519

(22) Filed: Dec. 19, 2017

(65) Prior Publication Data

US 2018/0191060 A1     Jul. 5, 2018

(30) Foreign Application Priority Data

Jan. 5, 2017   (TW) .............................. 106100275 A

(51) Int. Cl.
| | | |
|---|---|---|
| *H04M 1/00* | (2006.01) | |
| *H01Q 1/24* | (2006.01) | |
| *H01Q 13/10* | (2006.01) | |
| *H01Q 5/35* | (2015.01) | |
| *H01Q 1/48* | (2006.01) | |
| *H04M 1/02* | (2006.01) | |
| *H04B 1/401* | (2015.01) | |
| *H04B 1/00* | (2006.01) | |

(52) U.S. Cl.
CPC ............... *H01Q 1/243* (2013.01); *H01Q 1/48* (2013.01); *H01Q 5/35* (2015.01); *H01Q 13/10* (2013.01); *H04M 1/0283* (2013.01); *H04B 1/0064* (2013.01); *H04B 1/401* (2013.01)

(58) Field of Classification Search
CPC ...... H04M 1/0202; H04M 1/026; H04B 1/04; H04B 1/3833; H04B 7/0404; H04B 7/0413
USPC ........... 455/90.3, 552.1, 553.1, 575.1, 575.7; 343/845, 853
See application file for complete search history.

(56) References Cited

U.S. PATENT DOCUMENTS 7,936,307 B2 *   5/2011   Pang ...................... H01Q 1/243
                                                                343/702
9,455,499 B2 *   9/2016   Wong ....................... H01Q 5/35
(Continued)

FOREIGN PATENT DOCUMENTS

| CN | 103904414 | 7/2014 |
|---|---|---|
| TW | 201427181 | 7/2014 |

(Continued)

OTHER PUBLICATIONS

"Office Action of Taiwan Counterpart Application", dated Apr. 19, 2018, p. 1-p. 7.

*Primary Examiner* — Quochien B Vuong
(74) *Attorney, Agent, or Firm* — J.C. Patents

(57) ABSTRACT

A multiple antenna apparatus is provided. A first feed antenna unit is shared for receiving and transmitting radio frequency (RF) signals corresponding to a bandwidth of a first resonance mode, so as to increase antenna configurable space of the multiple antenna apparatus, and thus a closed slot antenna formed by a wire, a ground plane and a radiation element is able to be configured in the multiple antenna apparatus to receive and transmit the RF signals corresponding to a second resonance mode.

15 Claims, 6 Drawing Sheets

(56) References Cited

U.S. PATENT DOCUMENTS

| | | | |
|---|---|---|---|
| 9,484,631 B1* | 11/2016 | Napoles | H01Q 1/243 |
| 2014/0176378 A1 | 6/2014 | Yu et al. | |
| 2017/0033438 A1* | 2/2017 | Ghit | H01Q 1/243 |
| 2017/0338548 A1* | 11/2017 | Xiong | H04M 1/0277 |

FOREIGN PATENT DOCUMENTS

| | | |
|---|---|---|
| TW | 201626637 | 7/2016 |
| TW | I542078 | 7/2016 |
| TW | I550957 | 9/2016 |
| WO | 2015112008 | 7/2015 |

* cited by examiner

MULTIPLE ANTENNA APPARATUS

CROSS-REFERENCE TO RELATED APPLICATION

This application claims the priority benefit of Taiwan application serial no. 106100275, filed on Jan. 5, 2017. The entirety of the above-mentioned patent application is hereby incorporated by reference herein and made a part of this specification.

BACKGROUND

Technology Field

The disclosure relates to an antenna apparatus, particularly to, a multiple antenna apparatus.

Description of the Related Art

As wireless communication technologies rapidly progress, the wireless communication industry has become thriving. A light, thin and small mobile device integrated with a multi-band antenna becomes a considerably important design goal. Thus, the antenna applied to the mobile device must meet the requirements of the small size and the multi-band.

Mobile phones with metallic back covers are subject to the appearance of the industrial design, which limits the number of the antenna bands. In addition, the use of two Wi-Fi antennas in a mobile phone becomes more and more popular for high data rate. Therefore, the antenna configurable space on the metallic back cover gets smaller and smaller. How to efficiently use the limited space to configure the antenna and meet the communications requirements has become an important issue.

SUMMARY

The present invention provides a multiple antenna apparatus, where radio frequency (RF) signals in neighboring frequency bands for different communication technologies are received and transmitted by the same radiation part. Not only are the antenna gain, bandwidth and isolation improved, but the antenna configurable space of the multiple antenna apparatus is increased for configuring antennas for other frequency bands, and therefore the communication requirements for the multiple antenna apparatus are met.

A multiple antenna apparatus of the present invention includes a metallic back cover, a substrate, a ground plane, a first feed antenna unit and a second feed antenna unit. The metallic back cover includes a radiation part. The ground plane is disposed at the substrate and includes a main ground plan and an extension ground plane. The first feed antenna unit provides a first resonance mode. The first feed antenna unit includes a first radiation element and a second radiation element. The first radiation element is disposed at the substrate and one end of the first radiation element has a first feed point. The second radiation element is configured between the radiation part and the substrate. A feed terminal of the second radiation element is connected with the first feed point of the first radiation element. The feed terminal of the second radiation element receives a first feed signal from the first feed point, and resonates with the first radiation element and the radiation part to generate the first resonance mode. The second feed antenna unit includes a wire and a third radiation element. The wire is disposed at the substrate, and the wire and the ground plane forms a closed slot. The third radiation element is disposed at the substrate and configured at the center of the closed slot. The third radiation element has a second feed point, and a second feed signal of the second feed point and the closed slot generate a second resonance mode.

According to one aspect of the invention, the first feed antenna unit further provides a third resonance mode and a second harmonic mode. The first feed antenna unit further includes a grounding conductor, which is disposed at the substrate. The wire is located between the grounding conductor and the ground plane. One end of the grounding conductor is connected to the radiation part while another end of the grounding conductor is connected to the ground plane. The grounding conductor resonates with the second radiation element and the radiation part to generate the third resonance mode and the second harmonic mode.

According to one aspect of the invention, one end of the wire is connected to the main ground plane while another end of the wire is connected to the extension ground plane, and the wire is installed along the grounding conductor so that an L-shaped closed slot is formed by the wire, the main ground plane and the extension ground plane. According to one aspect of the invention, the third radiation element is disposed at the bend of the L-shaped closed slot.

According to one aspect of the invention, the third radiation element is a rectangle and has a first long side and a second long side. The first long side is closer to the wire than the second long side. The first long side is 0.5 mm away from the wire, and a width of the third radiation element is 2 mm.

According to one aspect of the invention, a slot area surrounding the third radiation element within the closed slot forms a resonance path, and the length of the resonance path is equal to a multiple of a half wavelength of radio frequency (RF) signals corresponding to the second resonance mode.

According to one aspect of the invention, the multiple antenna apparatus further includes a switch coupled between the wire and the grounding conductor, and a resonance path of the grounding conductor gets shorter as the switch turns on.

According to one aspect of the invention, a bandwidth for the second resonance mode covers 5150 to 5875 MHz.

According to one aspect of the invention, the first feed antenna unit further provides a fourth resonance mode. The first feed antenna unit further includes a radiation conductor disposed at the substrate, wherein one end of the radiation conductor is connected with the ground plane while another end of the radiation conductor is an open end, and the first radiation element, the radiation conductor, the extension ground plane and the radiation part resonate to generate the fourth resonance mode.

According to one aspect of the invention, the multiple antenna apparatus includes a first transceiver module, a second transceiver module, a first multiplexing filter and a second multiplexing filter. The first multiplexing filter is coupled to the first feed antenna unit and the first transceiver module, wherein the first transceiver module transmits and receives RF signals corresponding to the bandwidths of the first resonance mode, the third resonance mode, the fourth resonance mode and the second harmonic mode through the first multiplexing filter and the first feed antenna unit. The second multiplexing filter is coupled to the first multiplexing filter, the second feed antenna unit and the second transceiver module. The second transceiver module transmits and receives RF signals corresponding to the bandwidth of the first resonance mode through the first multiplexing filter, the second multiplexing filter and the first feed antenna unit; the second transceiver module transmits and receives RF signals corresponding to the bandwidth of the second resonance mode through the second multiplexing filter and the second feed antenna unit.

According to one aspect of the invention, the bandwidth of the first resonance covers 2400 to 2700 MHz; the bandwidth of the third resonance mode covers 704 to 960 MHz; the bandwidth of the second harmonic mode covers 1710 to 1950 MHz; the bandwidth of the forth resonance mode covers 1950 to 2170 MHz.

According to one aspect of the invention, a gap is formed between the second radiation element and the radiation part.

According to one aspect of the invention, the gap is 1 mm.

According to one aspect of the invention, a thickness of the metallic back cover is 1 mm.

According to one aspect of the invention, the multiple antenna apparatus includes a housing, which includes the metallic back cover. The metallic back cover includes the radiation part and a non-radiation part. The radiation part and the non-radiation part are insulated.

Upon the teachings of the present invention, the first radiation element, the second radiation element and the radiation part on the metallic back cover resonate to generate the first resonance mode. The bandwidth of first radiation mode can be provided for different communications technologies to receive and transmit RF signals, improving the antenna gain and bandwidth. Furthermore, the multiple antenna apparatus increases more antenna configurable space such that the closed slot antenna formed by the wire, the ground plane and the third radiation element is able to be installed, which meets the communications demands for the multiple antenna apparatus.

These and other features, aspects, and advantages of the present invention will become better understood with regard to the following description, appended claims, and accompanying drawings.

DETAILED DESCRIPTION

Figure 1:
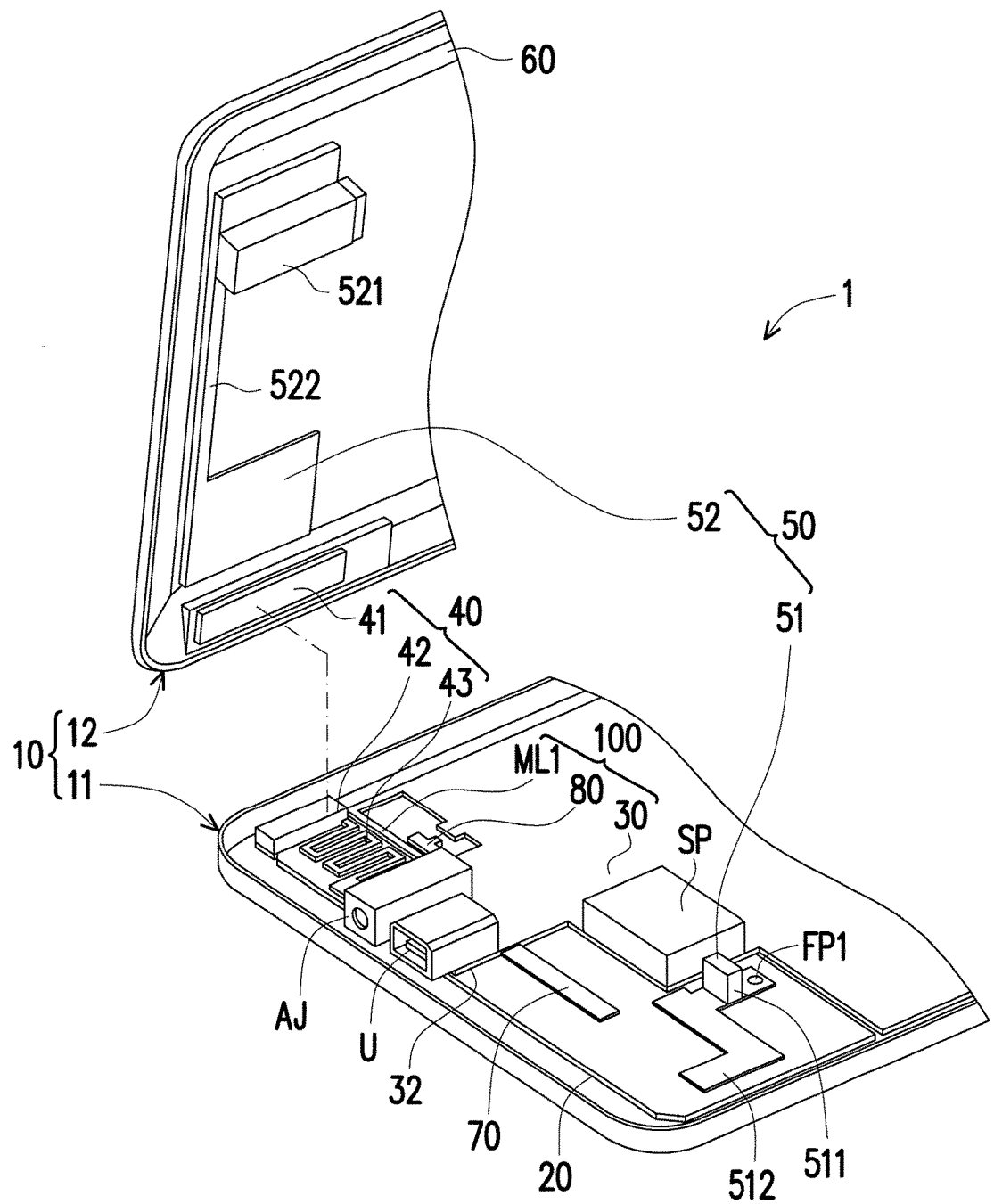
FIG. 1 is a schematic diagram of a multiple antenna apparatus according to an embodiment of the present invention.

Please refer to FIG. 1, which is a schematic diagram of a multiple antenna apparatus according to an embodiment of the present invention. A multiple antenna apparatus 1 includes a housing 10, a substrate 20, a ground plane 30, a grounding conductor 40, a first feed antenna unit 50, a second feed antenna unit 100, a partition 60, a radiation conductor 70, a USB port U, an audio jack AJ and a speaker SP. The multiple antenna apparatus 1 may be a smart phone, a tablet or any other portable electrical device with the communications functions. In addition, the substrate 20 and radiation elements, the ground plane and the conductors disposed thereon may be implemented by, for example, a printed circuit board, but not limited herein.

In an embodiment of the present invention, the housing 10 includes a front cover 11 and a metallic back cover 12, which is attachable to the front cover 11. As shown in a top view of an inner surface of the metallic back cover 12 of a multiple antenna apparatus 1 in FIG. 2, the metallic back cover 12 includes a radiation part 121 and non-radiation part 122. The radiation part 121 is located near a lower side of the metallic back cover 12. The radiation part 121 and the non-radiation part 122 are electrically insulated; that is, the radiation part 121 and the non-radiation part 122 are not electrically connected with each other. For example, a plastic gap 90 (around 1.5 to 2 mm) can be installed between the radiation part 121 and the non-radiation part 122, in order to insulate the electrical characteristics on both sides. In addition, FIG. 3 is a cross-sectional view of a multiple antenna apparatus according to an embodiment of the present invention. As shown in FIG. 3, the thickness h1 of the metallic back cover 12 is about 1 mm (as shown in FIG. 3), but not limited herein. Furthermore, the partition 60 is not illustrated in FIG. 2 because of the simplicity as well as the emphasis of the relative positions between the radiation part 121 and the non-radiation part 122.

Figure 4:
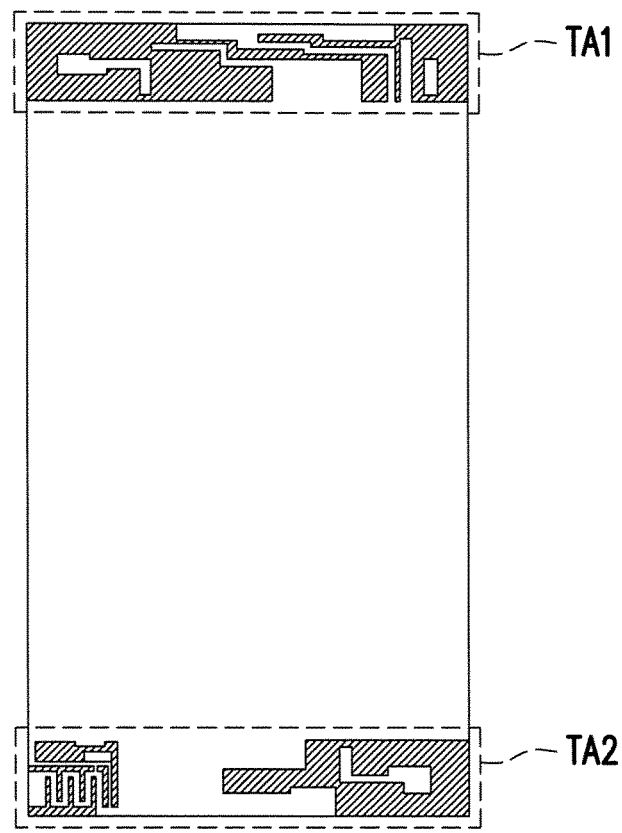
FIG. 4 is a schematic diagram of antenna configuration for a multiple antenna apparatus according to an embodiment of the present invention.

FIG. 4 is a schematic diagram of antenna configuration for a multiple antenna apparatus according to an embodiment of the present invention. Furthermore, the multiple antenna apparatus 1 may include two antenna configuration areas TA1 and TA2. For example, the antenna configuration area TA1 near the upper side of the metallic back cover 12 could be configured for LTE diversity antenna, GPS antenna and Wi-Fi main antenna while the antenna configuration area TA2 (corresponding to the radiation part 121) near the lower side of the metallic back cover 12 could be configured for the exemplary antenna of the present invention, such as Wi-Fi 5 G antenna, LTE main antenna, Wi-Fi 2.4 G antenna and etc., not limited herein.

Figure 5:
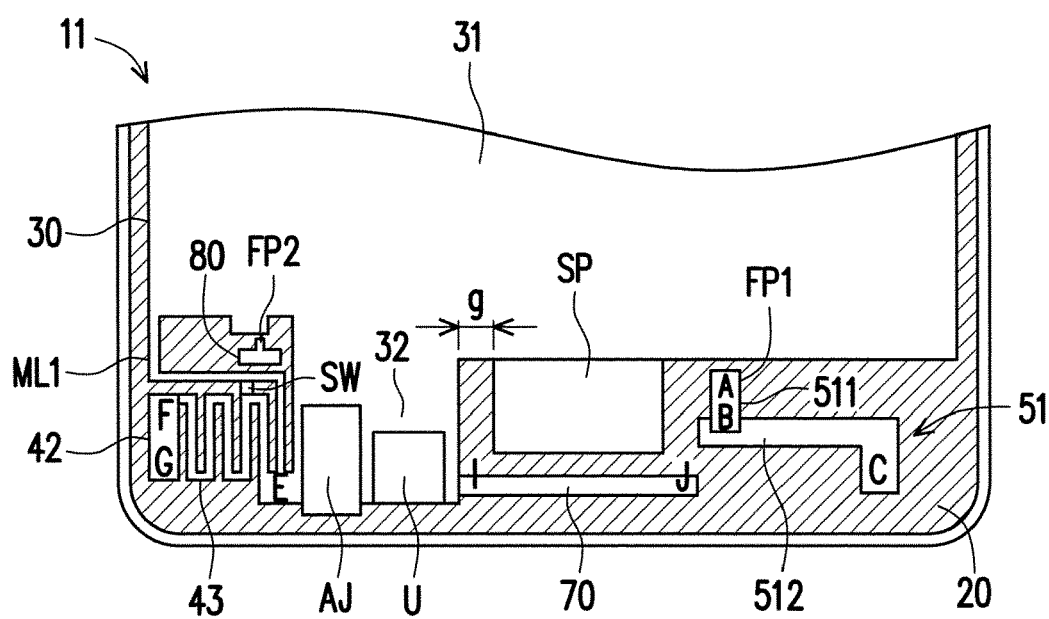
FIG. 5 is a top view of an inner surface of a front cover of a multiple antenna apparatus according to an embodiment of the present invention.

FIG. 5 is a top view of an inner surface of a front cover of a multiple antenna apparatus according to an embodiment of the present invention. Furthermore, the substrate 20 is disposed inside the housing 10, and at the inner surface of the front cover 11. The position of the substrate 20 corresponds to the radiation part 121 of the metallic back cover 12. In addition, the ground plane 30 is located inside the housing 10 and disposed at the front cover 11. The ground plane 30 includes a main ground plane 31 and an extension ground plane 32, wherein the extension ground plane 32 is formed by a side of the main ground plane 31 extending towards a side of the front cover 11. The position of the extension ground plane 32 is in correspondence with the positions of the radiation part 121 of the metallic back cover 12. The ground plane 30 may be, for example, a system ground of the multiple antenna apparatus 1.

According to an embodiment of the present invention, the grounding conductor 40 is disposed at the substrate 20. One end of the grounding conductor 40 is connected to the radiation part 121 of the metallic back cover 12 and another end of the grounding conductor 40 is connected to the ground plane 30. Moreover, the grounding conductor 40 may include a first connecting component 41, a second connecting component 42 and a metallic component 43. The first connecting component 41 is adhered to the radiation part 121 of the metallic back cover 12. The second connecting component 42 is disposed at the substrate 20. When the front cover 11 and the metallic back cover 12 are attached, the second connecting component 42 has contact with the first connecting component 41. The metallic component 43 is installed on the substrate 20 as an extension of the resonance path (i.e. increasing the path F-E shown in FIG. 5). According to the practical requirements, the metallic component 43 could be formed by multiple bends, but not limited herein. One end of the metallic component 43 is connected to the second connecting component 42 while another end is connected to the extension ground 32. That is, one end of the metallic component 43 is grounded. According to an embodiment of the present invention, the first connecting component 41 and the second connecting component 42 are elastic metal strip, but not limited herein.

According to an embodiment of the present invention, the first feed antenna unit 50 may include a first radiation element 51 and a second radiation element 52. The first radiation element 51 is disposed at the substrate 20 and includes a third connecting component 511 and a first radiation main body 512. In order to increase the resonance path (i.e. increasing the path B-C shown in FIG. 5), one end of the first radiation main body 512 is bent and then goes open circuited. Moreover, another end of the first radiation main body 512 is connected to the third connecting component 511. The third connecting component 511 is a feed point FP1 of the antenna for receiving first feed signal. The second radiation element 52 is disposed between the substrate 20 and the radiation part 121 of the metallic back cover 12. The second radiation element 52 may include a fourth connecting component 521 and a second radiation main body 522. In order to increase the resonance path (i.e. increasing the path Q-R and the path P-O-S shown in FIG. 2), the two ends of the second radiation main body 522 are wider than the middle of the radiation main body 522. The fourth connecting component 521 is connected to the second radiation main body 522 (shown in FIG. 1). When the front cover 11 and the metallic back cover 12 are attached, the fourth connecting component 521 has contact with the third connecting component 511, such that the second radiation element 52 is connected with the first radiation element 51 and the second radiation element 52 is separated from the radiation part 121 of the metallic back cover 12 with a distance h2. The distance h2 is, for example, 1 mm (shown in FIG. 3), but not limited herein. Furthermore, the third connecting component 511 and the fourth connecting component 521 are, for example, elastic metal strips, but not limited herein.

In addition, the partition 60 is installed between the second radiation main body 522 of the second radiation element 52 and the radiation part 121 of the metallic back cover 12. The partition 60 is made of insulated material and adhered to the inner surface of the radiation part 121 of the metallic back cover 12 to allow the second radiation element 52 to attach on. According to an embodiment of the present invention, the distance h2 between the second radiation element 52 and the radiation part 121 is about 1 mm so the thickness of the partition 60 is about 1 mm.

According to an embodiment of the present invention, the radiation conductor 70 (i.e. the path I-J) is disposed at the substrate 20, and one end of the radiation conductor 70 is connected with the extension ground plane 32 (i.e. one end is grounded) while another end of the radiation conductor 70 is an open end.

According to an embodiment of the present invention, the USB port U is disposed at the extension ground plane 32. The audio jack AJ is also installed at the extension ground plane 32 and adjacent to the USB port U. The speaker SP is installed at the substrate 20 with at least one side connected to the ground plane 30.

Figure 2:
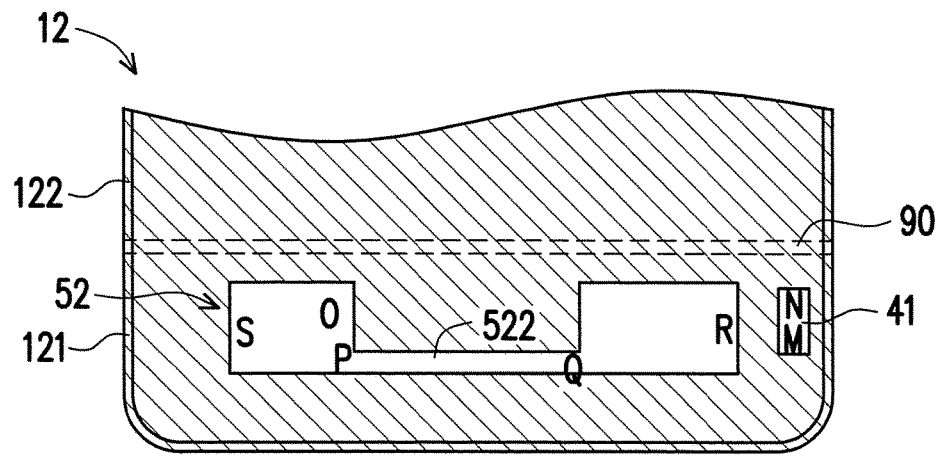
FIG. 2 is a top view of an inner surface of a metallic back cover of a multiple antenna apparatus according to an embodiment of the present invention.
Figure 3:
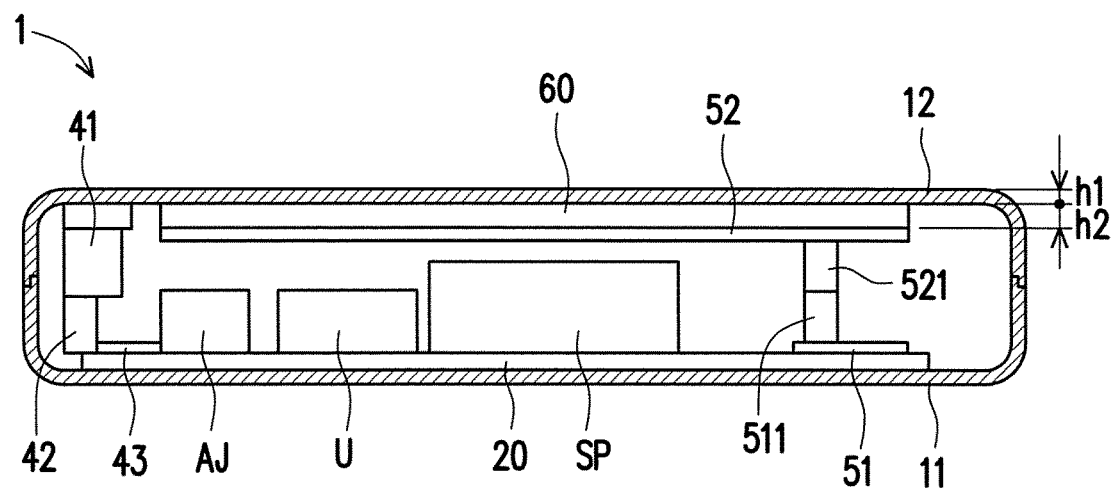
FIG. 3 is a cross-sectional view of a multiple antenna apparatus according to an embodiment of the present invention.

As shown in FIG. 2 and FIG. 5, when the metallic back cover 12 and the front cover 11 are attached (i.e. flipping the metallic back cover 12 shown in FIG. 2 and placing it on the front cover 11 shown in FIG. 5), the point B in FIG. 5 touches the point P in FIG. 2 (those two pints are where the third connecting component 511 and the fourth connecting component 521 are installed). That is, the first radiation element 51 and the second radiation element 52 are connected to form a radiation unit. One end of the radiation unit is the feed point FP1 of the antenna (which is the feed point of the first radiation element 51, and the feed point of the second radiation element 52 is connected to the feed point FP1). Furthermore, the radiation element 52 and the radiation part 121 of the metallic back cover 12 are apart from each other within a certain distance (also referred to as a coupling distance, for example, the distance h2 of 1 mm between the second radiation element 52 and the radiation part 121 of the metallic back cover 12 in FIG. 3). Since the radiation part 121 of the metallic back cover 12 resonates with the radiation unit consisting of the first radiation element 51 and the second radiation element 52 to generate the first resonance mode, the bandwidth of which covers, for example, 2400 to 2700 MHz.

On the other hand, the second feed antenna unit 100 may include a wire ML1 and the third radiation element 80. The wire ML1 and the third radiation element 80 are disposed at the substrate 20. A closed slot is formed by the wire ML1 and the ground plane 30. The third radiation element 80 is configured in the middle of the closed slot, i.e., in the center of the shape of the closed slot. The feed point FP2 of the third radiation element 80 can receive the second feed signal and resonates with the closed slot to generate the second resonance mode. The bandwidth of the second resonance mode covers, for example, 5150 to 5875 MHz. A slot area surrounding the third radiation element 80 within the closed slot forms a resonance path. The length of the resonance path is equal to a multiple of a half wavelength of radio frequency (RF) signals corresponding to the second resonance mode.

Moreover, in the embodiment of the present invention, one end of the wire ML1 is connected to the main ground plane 31 while another end of the wire ML1 is connected to the extension ground plane 32. The wire ML1 is installed along the edge of the grounding conductor 40 so that an L-shaped closed slot is formed by the wire ML1, the main ground plane 31 and the extension ground plane 32. It's noted that the shape of the closed slot formed by the wire ML1 and the ground plane 30 is not limited to this embodiment. The shape of the closed slot may be in other shapes, for example, a rectangle, depending on different antenna configurable space inside the multiple antenna apparatus 1 or different grounding conductor 40. In addition, the L-shaped closed slot is bent at the middle of the two ends of the L-shaped closed slot so the third radiation element 80 is disposed at the bend of the L-shaped closed slot, i.e. the middle of the two ends of the L-shaped antenna. In other embodiments, the third radiation element 80 may be disposed at different places due to the different shapes of the closed slot. Basically, the third radiation element 80 is disposed at the center of the closed slot.

Figure 6:
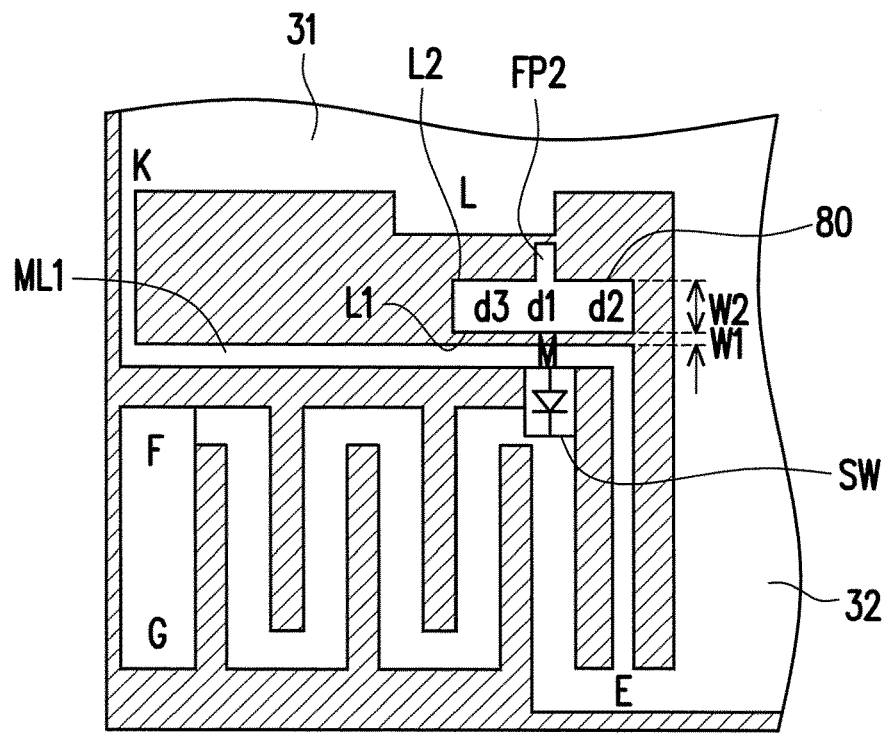
FIG. 6 is a schematic diagram of a second feed antenna unit according to an embodiment of the present invention.

FIG. 6 is a schematic diagram of a second feed antenna unit according to an embodiment of the present invention. To be specific, the third radiation element 80 is a rectangle with a first long side L1 and a second long side L2. The first long side L1 is closer to the wire ML1 than the second long side L2. By adjusting the distance w1 between the first long side L1 and the wire ML1 and the width w2 of the third radiation element 80, the bandwidth of the second resonance mode can be changed. When the distance w1 between the first long side L1 and the wire ML1 or the width W2 of the third radiation element 80 is smaller, the bandwidth of the second resonance mode becomes narrower. According to an embodiment of the present invention, the first long side L1 is, for example, 0.5 mm away from the wire ML1; the width W2 of the third radiation element 80 is, for example, 2 mm; the first long side L1 is, for example, 5 mm.

Furthermore, when the metallic back cover 12 and the front cover 11 are attached to each other, the first connecting component 41 is in contact with the second connecting component 42 (please refer to FIGS. 2 and 5, the point G touches the point N and the point F touches the point M), the radiation part 121 of the metallic back cover 12 connects to the grounding conductor 40 to form another radiation unit. One end of this radiation unit is connected to the ground. The second radiation element 52 is apart from the radiation part 121 of the metallic back cover 12 within a certain distance (coupling distance). The radiation unit consisting of the grounding conductor 40 and the radiation part 121 of the metallic back cover 12 can be activated by the radiation unit formed by the first feed antenna unit 50 through the capacitive coupling and generates a third resonance mode and a second harmonic mode. The third resonance mode covers, for example, 704 to 960 MHz and the second harmonic mode covers, for example, 1710 to 1950 MHz. Moreover, the radiation conductor 70 is apart from the second radiation element 52 within a certain distance. Therefore, the radiation conductor 70 is activated by the first feed antenna unit 50 through the capacitive coupling and generates the fourth resonance mode, broadening the operation bandwidth of the high level resonance mode for the antenna. The bandwidth of the fourth resonance mode covers 1950 to 2170 MHz.

According to an embodiment of the present invention, a proper design of the lengths and widths of the radiation part 121, the metallic component 43, the first radiation element 51 and the second radiation element 52 and a proper configuration of those components and the USB port U, the audio jack AJ and the speaker SP (shown in FIGS. 2 and 5) can allow the radiation part 121 and the grounding conductor 40 to resonate with the feed antenna unit 50 to generate a resonance mode covering 704 to 960 MHz. Also a proper design of the lengths and widths of the radiation conductor 70 in cooperation with the capacitive coupling of the first feed antenna unit 50 can allow the bandwidths of the high level resonance mode and the resonance mode generated by the radiation conductor 70 and the first feed antenna unit 50 to cover 1575 to 2700 MHz. The applicable bandwidth includes LTE700/GSM850/EGSM900/DCS1800/PCS1900/UMTS2100/LTE2500/WIFI2.4G/LTEB7.

Figure 7:
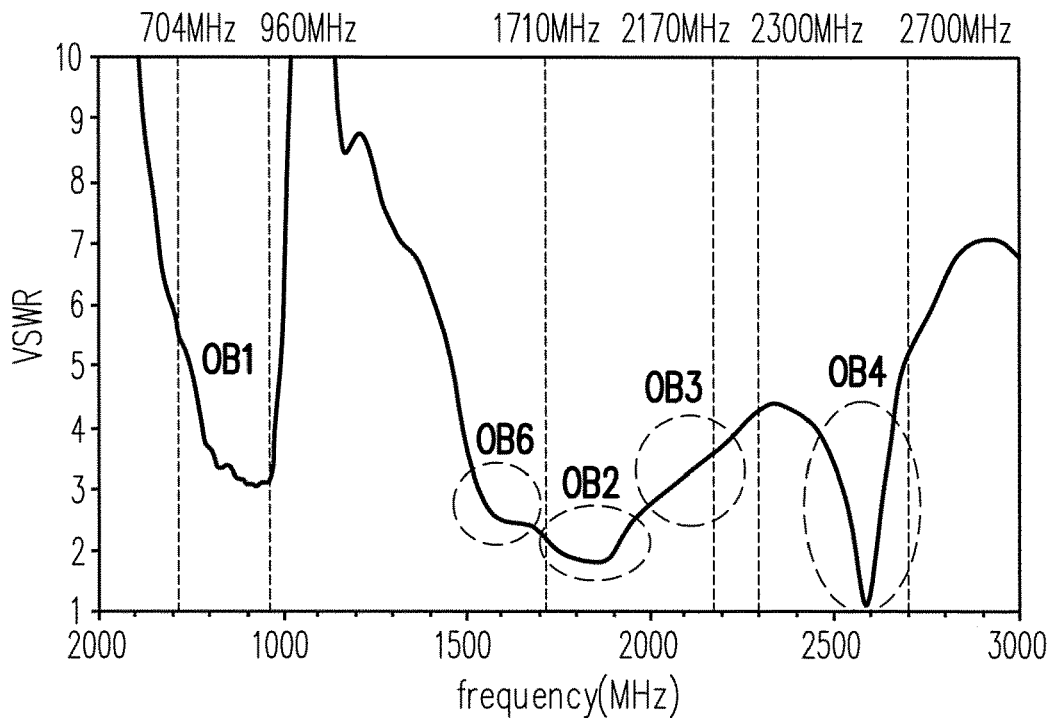
FIG. 7 is a measurement result of VSWR for a first feed antenna unit according to an embodiment of the present invention.

FIG. 7 is a measurement result of VSWR for a first feed antenna unit according to an embodiment of the present invention. Furthermore, the path A-B-O-S-P-Q-R of the first feed antenna 50 and the path E-F-G-M-N of the radiation part 121 and the grounding conductor 40 can allow the first feed antenna unit 50 to resonate with the radiation part 121 to generate an operation bandwidth OB1 of 704 to 960 MHz and a double frequency operation bandwidth OB2 of 1710 to 1950 MHz. The extension of the path O-P-S of the first feed antenna unit 50 can allows the operation bandwidth OB6 to cover 1575 MHz. That is, the first feed antenna unit 50 and the radiation part 121 can resonate to generate the operation bandwidth OB6 of 1575 MHz. The radiation unit formed by the radiation part 121 and the grounding conductor 40 can resonate with the radiation conductor 70 (i.e. the path I-J) to generate the operation bandwidth OB3 of 1950 to 2170 MHz. Meanwhile, the adjustment of the length and the width between the radiation conductor 70 and the speaker SP can allow the resonance frequency of the operation bandwidth OB3 to cover 1900 MHz. In addition, the resonance path of the radiation conductor 70 can be increased by adjusting the distance g (please refer to FIG. 5) between one side of the speaker SP and the extension ground 32 of the ground plane 30. The path B-C extended from the first feed antenna unit 50 can allow the first feed antenna unit 50 and the radiation part 121 to resonate to generate the operation bandwidth OB4 of 2400 to 2700 MHz and tune the operation bandwidth OB3 up to 2100 MHz.

Figure 8:
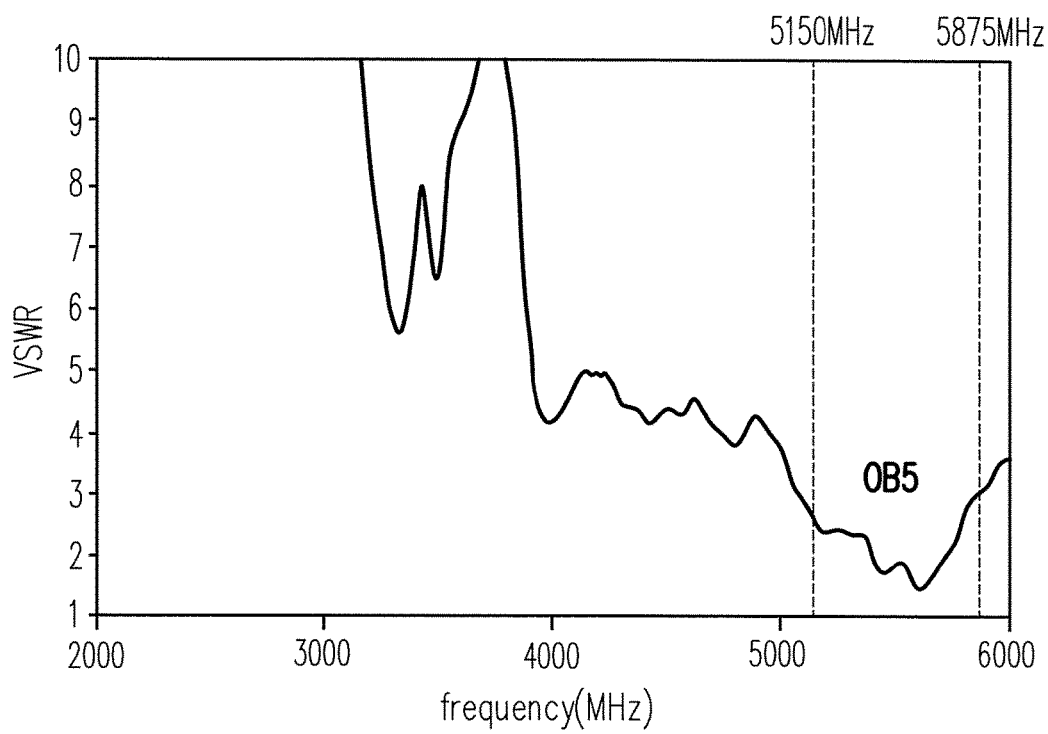
FIG. 8 is a measurement result of VSWR for a second feed antenna unit according to an embodiment of the present invention.

FIG. 8 is a measurement result of VSWR for a second feed antenna unit according to an embodiment of the present invention; please refer to FIGS. 6 and 8. Furthermore, the third radiation element 80 can receive the second feed signal from the feed point FP2. A combination of the path d1-d2-d3 and the closed path E-M-K-L forms a closed slot antenna and resonates to generate the operation bandwidth OB5 covering 5150 to 5875 MHz, which can be applied to Wi-Fi 5 G bandwidth. The impedance match and the bandwidth of the closed slot antenna can be adjusted though the length and the width of the slot. For example, decreasing the gap W1 in FIG. 6 can broaden the bandwidth.

Moreover, as shown in FIG. 6, a switch SW can be placed between the metallic component 43 of the grounding conductor 40 and the wire ML1. The switch SW may be, for example, a diode (as shown in FIG. 6), but not limited herein. In other embodiments of the present invention, the switch may be implemented by a relay. When the switch 80 is off, the resonance path is longer and thereby the bandwidth (about 704 to 824 MHz) of the application band LTE700 can be generated. When the switch SW is on, the resonance path is shortened and thereby the previous bandwidth of the application band LTE700 is tuned to the bandwidth (824 to 960 MHz) of the application bands GSM850 and EGSM900. In other words, the switch SW is used for adjusting the length of the resonance path, thereby adjusting the range of the bandwidth. Also, the switch SW has an advantage for downsizing the electrical components. In addition, the bandwidth of the application band LTE700 can be generated by connecting the metallic component 43 and the inductor in series according to some embodiments of the present invention.

Figure 9:
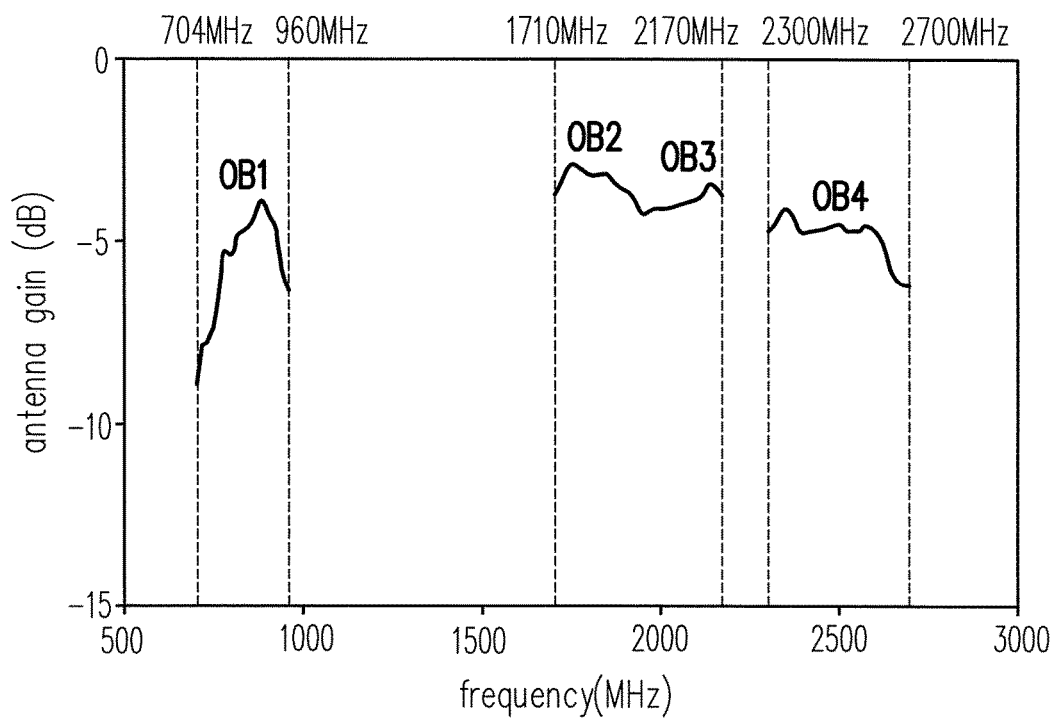
FIG. 9 is a plot of antenna gain for a first feed antenna unit according to an embodiment of the present invention.
Figure 10:
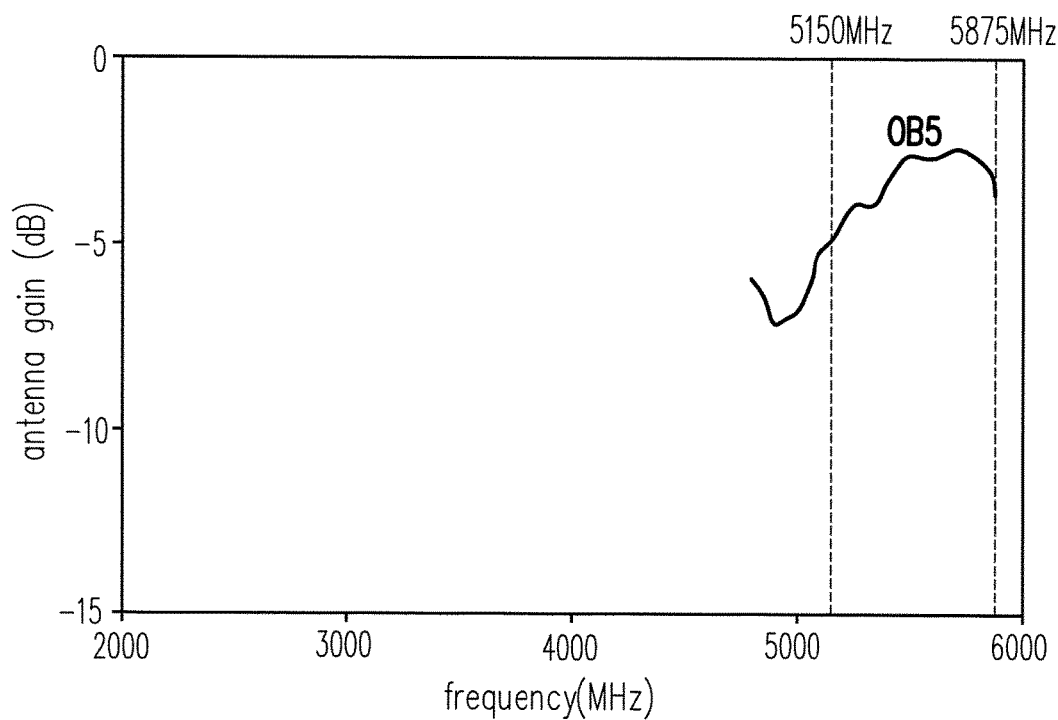
FIG. 10 is a plot of antenna gain for a first feed antenna unit according to an embodiment of the present invention.

Besides, FIGS. 9 and 10 are plots of antenna gain for a first feed antenna unit according to an embodiment of the present invention. As seen in FIGS. 9 and 10, the antenna gain of the first feed antenna unit 50 can achieve −5 dB in the operation bandwidths OB1, OB2, OB3, OB4 and OB5.

The aforementioned multiple antenna apparatus can effectively improve the antenna gain.

Figure 11:
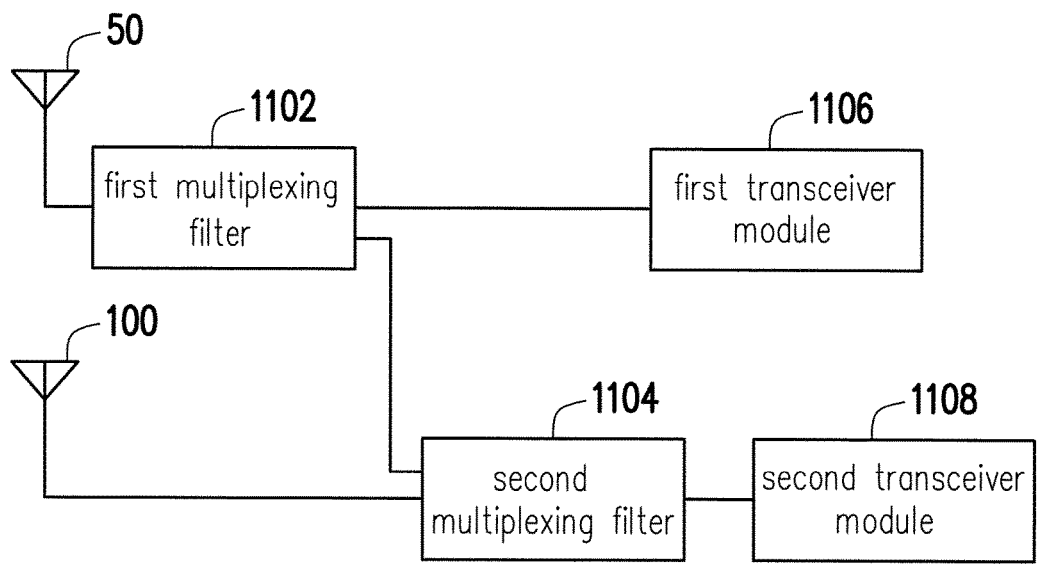
FIG. 11 is a schematic diagram of a multiple antenna apparatus according to another embodiment of the present invention.

FIG. 11 is a schematic diagram of a multiple antenna apparatus according to another embodiment of the present invention. The multiple antenna apparatus 1 may include the first feed antenna unit 50, the second feed antenna unit 100, the first multiplexing filter 1102, the second multiplexing filter 1104, the first transceiver module 1106 and the second transceiver module 1108. The first multiplexing filter 1102 is coupled to the first feed antenna unit 50, the first transceiver module 1106 and the second multiplexing filter 1104. The second multiplexing filter 1104 is coupled to the second feed antenna unit 100 and the second transceiver module 1108. The first transceiver module 1106 receives the RF signals corresponding to the bandwidths of the first resonance mode, the third resonance mode, the fourth resonance mode and the second harmonic mode, through the first multiplexing filter 1102 and the first feed antenna unit 50. The second transceiver module 1108 receives the RF signals corresponding to the bandwidth of the first resonance mode, through the first multiplexing filter 1102, the second multiplexing filter 1104 and the first feed antenna unit 50; and receives the RF signals corresponding to the bandwidth of the second resonance mode, through the second multiplexing filter 1104 and the second feed antenna unit 100. That is, the first transceiver module 1106 and the second transceiver module 1108 can share the first feed antenna unit 50 to receive/transmit the RF signals corresponding to the bandwidth of the first resonance mode, and thereby the antenna configurable space is increased for configuring antenna for other frequency bands, and the antenna gain and bandwidth are effectively improved. In the embodiments of present invention, the bandwidth of the first resonance mode covers 2400 to 2700 MHz, which could be used for Wi-Fi 2.4 G and LTE B7. By sharing the first feed antenna unit 50, the antenna configurable space in the multiple antenna apparatus is increased. Therefore, the second feed antenna unit 100 for receiving/transmitting the RF signals corresponding to the second resonance mode can be added. In the embodiments of the present invention, for example, the bandwidth of the second resonance mode covers 5150 to 5875 MHz, which can be used for Wi-Fi 5 G to meet the communications requirements for the multiple antenna apparatus 1.

To sum up, according to the embodiment, the first radiation element of the first feed antenna unit, the second radiation element and the radiation part of the metallic back cover can resonate to generate the first resonance mode. The bandwidth of first resonance mode can be provided for receiving/transmitting the RF signals in the frequency bands for different communication technologies. By sharing the first feed antenna unit to receive/transmit the RF signals corresponding to the bandwidth of the first resonance mode, the antenna gain and the bandwidth can be effectively improved. Further, the antenna configurable space of the multiple antenna apparatus is increased for the installment of the closed slot antenna formed by the wire, grounding plane and the third radiation element to receive/transmit the RF signals corresponding to the second resonance mode, and meet the communications requirements for multiple antenna apparatus.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A multiple antenna apparatus, comprising:
a metallic back cover, comprising a radiation part;
a substrate;
a ground plane disposed at the substrate, comprising a main ground plane and an extension ground plane;
a first feed antenna unit providing a first resonance mode, the first feed antenna unit comprising:
a first radiation element disposed at the substrate, one end of the first radiation element having a first feed point; and
a second radiation element configured between the radiation part and the substrate, wherein a feed terminal of the second radiation element is connected with the first feed point of the first radiation element for receiving a first feed signal from the first feed point, and resonates with the first radiation element and the radiation part to generate the first resonance mode; and
a second feed antenna unit comprising:
a wire disposed at the substrate, wherein the wire and the ground plane forms a closed slot; and
a third radiation element disposed at the substrate and configured at a center of the closed slot, wherein the third radiation element has a second feed point, and a second feed signal of the second feed point generates a second resonance mode with the closed slot.

2. The multiple antenna apparatus of claim 1, wherein the first feed antenna unit further provides a third resonance mode and a second harmonic mode, the first feed antenna unit further comprising:
a grounding conductor disposed at the substrate, wherein the wire is located between the grounding conductor and the ground plane, one end of the grounding conductor is connected to the radiation part, another end of the grounding conductor is connected to the ground plane, and the grounding conductor resonates with the second radiation element and the radiation part to generate the third resonance mode and the second harmonic mode.

3. The multiple antenna apparatus of claim 2, wherein one end of the wire is connected to the main ground plane, another end of the wire is connected to the extension ground plane, and the wire is installed along an edge of the grounding conductor so that an L-shaped closed slot is formed by the wire, the main ground plane and the extension ground plane.

4. The multiple antenna apparatus of claim 3, wherein the third radiation element is disposed at a bend of the L-shaped closed slot.

5. The multiple antenna apparatus of claim 4, wherein the third radiation element is a rectangle and has a first long side and a second long side, the first long side is closer to the wire than the second long side, and the first long side is 0.5 mm away from the wire, and a width of the third radiation element is 2 mm.

6. The multiple antenna apparatus of claim 4, wherein a slot area surrounding the third radiation element within the closed slot forms a resonance path, and the length of the resonance path is equal to a multiple of a half wavelength of radio frequency (RF) signals corresponding to the second resonance mode.

7. The multiple antenna apparatus of claim 2 further comprising:

a switch coupled between the wire and the grounding conductor, wherein a resonance path of the grounding conductor gets shorter as the switch turns on.

8. The multiple antenna apparatus of claim 2, wherein the first feed antenna unit further provides a fourth resonance mode, the first feed antenna unit further comprising:
a radiation conductor disposed at the substrate, wherein one end of the radiation conductor is connected with the ground plane, another end of the radiation conductor is an open end, and the first radiation element, the radiation conductor, the extension ground plane and the radiation part resonate to generate the fourth resonance mode.

9. The multiple antenna apparatus of claim 8 further comprising:
a first transceiver module;
a second transceiver module;
a first multiplexing filter coupled to the first feed antenna unit and the first transceiver module, wherein the first transceiver module transmits and receives RF signals corresponding to the bandwidths of the first resonance mode, the third resonance mode, the fourth resonance mode and the second harmonic mode through the first multiplexing filter and the first feed antenna unit; and
a second multiplexing filter coupled to the first multiplexing filter, the second feed antenna unit and the second transceiver module, wherein the second transceiver module transmits and receives RF signals corresponding to the bandwidth of the first resonance mode through the first multiplexing filter, the second multiplexing filter and the first feed antenna unit; the second transceiver module transmits and receives RF signals corresponding to the bandwidth of the second resonance mode through the second multiplexing filter and the second feed antenna unit.

10. The multiple antenna apparatus of claim 8, wherein the bandwidth of the first resonance covers 2400 to 2700 MHz; the bandwidth of the third resonance mode covers 704 to 960 MHz; the bandwidth of the second harmonic mode covers 1710 to 1950 MHz; the bandwidth of the forth resonance mode covers 1950 to 2170 MHz.

11. The multiple antenna apparatus of claim 1, wherein a bandwidth of the second resonance mode covers 5150 to 5875 MHz.

12. The multiple antenna apparatus of claim 1, wherein a gap is formed between the second radiation element and the radiation part.

13. The multiple antenna apparatus of claim 12, wherein the gap is 1 mm.

14. The multiple antenna apparatus of claim 1, wherein the thickness of the metallic back cover is 1 mm.

15. The multiple antenna apparatus of claim 1 further comprising:
a housing comprising the metallic back cover, the metallic back cover comprising the radiation part and a non-radiation part, wherein the radiation part and the non-radiation part are insulated.

\* \* \* \* \*